United States Patent
Yu et al.

(10) Patent No.: US 12,498,727 B2
(45) Date of Patent: Dec. 16, 2025

(54) METHOD FOR DISPLAYING POSTURE OF ROBOT IN THREE-DIMENSIONAL MAP, APPARATUS, DEVICE, AND STORAGE MEDIUM

(71) Applicant: Beijing Roborock Innovation Technology Co., Ltd., Beijing (CN)

(72) Inventors: Yang Yu, Beijing (CN); Zhen Wu, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 211 days.

(21) Appl. No.: 18/257,346

(22) PCT Filed: Nov. 29, 2021

(86) PCT No.: PCT/CN2021/134005
§ 371 (c)(1),
(2) Date: Jun. 14, 2023

(87) PCT Pub. No.: WO2022/127572
PCT Pub. Date: Jun. 23, 2022

(65) Prior Publication Data
US 2024/0012425 A1    Jan. 11, 2024

(30) Foreign Application Priority Data
Dec. 14, 2020 (CN) .......................... 202011471918.6

(51) Int. Cl.
G05D 1/00        (2024.01)
(52) U.S. Cl.
CPC ........... *G05D 1/0274* (2013.01); *G05D 1/024* (2013.01)
(58) Field of Classification Search
None
See application file for complete search history.

(56) References Cited

FOREIGN PATENT DOCUMENTS

| CN | 102096713 A | 6/2011 |
|---|---|---|
| CN | 105045263 A | 11/2015 |

(Continued)

OTHER PUBLICATIONS

Chang Xuesong, A kind of service robot and its indoor navigation method based on ROS, 2017. NPL attached.*

(Continued)

*Primary Examiner* — James M Mcpherson
*Assistant Examiner* — Bakari Underwood
(74) *Attorney, Agent, or Firm* — Calfee, Halter & Griswold LLP

(57) ABSTRACT

The present disclosure provides a method for displaying a pose of a robot in a three-dimensional map, an apparatus, a device, and a storage medium. The method includes: acquiring a three-dimensional map of a space in which the robot is located; acquiring a two-dimensional map constructed by the robot; matching the three-dimensional map with the two-dimensional may constructed by the robot to obtain a correspondence between the three-dimensional map and the two-dimensional map constructed by the robot; acquiring a nose of the robot on the two-dimensional map constructed by the robot; and displaying a pose of the robot in the three-dimensional map based on the pose of the robot on the two-dimensional map constructed by the robot and the correspondence between the three-dimensional map and the two-dimensional map constructed by the robot.

17 Claims, 11 Drawing Sheets

(56) References Cited

FOREIGN PATENT DOCUMENTS

| | | | |
|---|---|---|---|
| CN | 106780735 A | * 5/2017 | ............. G01C 21/00 |
| CN | 107145153 A | * 9/2017 | |
| CN | 107263449 A | 10/2017 | |
| CN | 107272454 A | 10/2017 | |
| CN | 108269305 A | 7/2018 | |
| CN | 108510825 A | 9/2018 | |
| CN | 111476904 A | 7/2020 | |
| CN | 111552764 A | 8/2020 | |
| CN | 111637890 A | 9/2020 | |
| JP | 2003114614 A | 4/2003 | |
| JP | 2017198517 A | 11/2017 | |
| WO | 2019/055281 A2 | 3/2019 | |

OTHER PUBLICATIONS

Cheng Jun, Semantic map construction method and device, as well as robot, 2020, NPL attached.*
Extended European Search Report of application No. 21905501.9 dated Oct. 18, 2024.
Paper titled 2D3D-MatchNet Learning to Match Keypoints Across 2D Image and 3D Point Cloud.
Paper titled Monocular Camera Localization in Prior LiDAR Maps with 2D-3D Line Correspondences.
International Search Report from PCT/2021/134005 dated Feb. 11, 2022.
Second Office Action of CN application No. 202011471918.6 dated Jul. 29, 2025.
First Office Action of CN application No. 202011471918.6 dated Feb. 28, 2025.

* cited by examiner

METHOD FOR DISPLAYING POSTURE OF ROBOT IN THREE-DIMENSIONAL MAP, APPARATUS, DEVICE, AND STORAGE MEDIUM

The present application is a 371 application of PCT Application No. PCT/CN2021/134005, filed on Nov. 29, 2021, which is based upon and claims priority to Chinese Patent Application No. 202011471918.6, filed on Dec. 14, 2020 and entitled "METHOD AND DEVICE FOR DISPLAYING POSE OF ROBOT IN THREE-DIMENSIONAL MAP, APPARATUS AND STORAGE MEDIUM", the entire contents of which are incorporated herein by reference.

TECHNICAL FIELD

The present disclosure relates to the field of data processing technologies, and in particular to a method and apparatus for displaying a pose of a robot in a three-dimensional map, a device and a readable storage medium.

BACKGROUND

With the development of computer technologies and artificial intelligence technologies, there occurs a variety of robots with an intelligent system, such as a ground sweeping robot, a ground mopping robot, a vacuum cleaner, a lawn mower and so on. These robots may automatically march in a certain area and perform cleaning, sweeping or other operations without user operation. Generally, the robot is installed with a laser distance sensor (LDS) and thereby measures via the LDS a distance from the robot to various obstacles in the work area during the working process to plot a simultaneous map of an area where the robot is located, and then feeds the map as plotted back to the user to allow the user to grasp the map information of the area.

SUMMARY

The present disclosure provides a method and apparatus for displaying a pose of a robot in a three-dimensional map, a device and a readable storage medium to overcome, at least to some extent, the technical problem in the prior art of inability to acquire height information of obstacles in the area where the robot is located.

Other features and advantages of the present disclosure will become apparent through the following detailed description, or be learned partially through the practice of the present disclosure.

According to an aspect of the present disclosure, provided is a method for displaying a pose of a robot in a three-dimensional map. The method includes: acquiring a three-dimensional map of a space in which the robot is located; acquiring a two-dimensional map constructed by the robot; matching the three-dimensional map with the two-dimensional map constructed by the robot to obtain a correspondence between the three-dimensional map and the two-dimensional map constructed by the robot; acquiring a pose of the robot on the two-dimensional map constructed by the robot; and displaying a pose of the robot in the three-dimensional map based on the pose of the robot on the two-dimensional map constructed by the robot and the correspondence between the three-dimensional map and the two-dimensional map constructed by the robot.

According to an embodiment of the present disclosure, matching the three-dimensional map with the two-dimensional map constructed by the robot to obtain the correspondence between the three-dimensional map and the two-dimensional map constructed by the robot includes: acquiring a valid portion of the three-dimensional map; projecting the valid portion of the three-dimensional map onto a horizontal plane to obtain a two-dimensional projection map; and matching the two-dimensional projection map with the two-dimensional map constructed by the robot to obtain a correspondence between the two-dimensional projection map and the two-dimensional map constructed by the robot.

According to an embodiment of the present disclosure, obstacle data acquired by the robot during constructing the two-dimensional map is three-dimensional data; and acquiring the valid portion of the three-dimensional map includes: determining a scanning range of the robot based on the three-dimensional data, and determining a three-dimensional map within the scanning range of the robot as the valid portion of the three-dimensional map.

According to an embodiment of the present disclosure, matching the two-dimensional projection map with the two-dimensional map constructed by the robot to obtain the correspondence between the two-dimensional projection map and the two-dimensional map constructed by the robot includes: matching the two-dimensional projection map with the two-dimensional map constructed by the robot by using a method of maximizing an overlapping area; and obtaining the correspondence between the two-dimensional projection map and the two-dimensional map constructed by the robot when the overlapping area between the two-dimensional projection map and the two-dimensional map constructed by the robot is maximized.

According to an embodiment of the present disclosure, matching the three-dimensional map with the two-dimensional map constructed by the robot to obtain the correspondence between the three-dimensional map and the two-dimensional map constructed by the robot includes: acquiring a marker of at least one specified obstacle in the three-dimensional map; acquiring a marker of the at least one specified obstacle in the two-dimensional map constructed by the robot; and matching the marker of the at least one specified obstacle in the three-dimensional map and the marker of the at least one specified obstacle in the two-dimensional map constructed by the robot to obtain the correspondence between the three-dimensional map and the two-dimensional map constructed by the robot.

According to an embodiment of the present disclosure, is the at least one specified obstacle includes a plurality of specified obstacles, and the plurality of the specific obstacles is not located on a straight line.

According to an embodiment of the present disclosure, the specified obstacles include a charging pile and a wall.

According to an embodiment of the present disclosure, the method further includes: modifying the three-dimensional map based on the two-dimensional map constructed by the robot when the robot constructs the two-dimensional map.

According to an embodiment of the present disclosure, the method further includes: displaying a three-dimensional model of the robot in equal scale with the three-dimensional map.

According to another aspect of the present disclosure, provided is an apparatus for displaying a pose of a robot in a three-dimensional map, which includes: a three-dimensional map acquiring module configured to acquire a three-dimensional map of a space in which the robot is located; a constructed map acquiring module configured to acquire a two-dimensional map constructed by the robot; a map matching module configured to match the three-dimensional map with the two-dimensional map constructed by the robot to obtain a correspondence between the three-dimensional map and the two-dimensional map constructed by the robot; a pose acquiring module configured to acquire a pose of the robot on the two-dimensional map constructed by the robot; and a three-dimensional display module configured to display a pose of the robot in the three-dimensional map based on the pose of the robot on the two-dimensional map constructed by the robot and the correspondence between the three-dimensional map and the two-dimensional map constructed by the robot.

According to an embodiment of the present disclosure, the map matching module includes: a map selecting module configured to acquire a valid portion of the three-dimensional map; a two-dimensional projecting module configured to project the valid portion of the three-dimensional map onto a horizontal plane to obtain a two-dimensional projection map; and a two-dimensional map matching module configured to match the two-dimensional projection map with the two-dimensional map constructed by the robot to obtain a correspondence between the two-dimensional projection map and the two-dimensional map constructed by the robot.

According to an embodiment of the present disclosure, obstacle data acquired by the robot during constructing the two-dimensional map is three-dimensional data; and the map selecting module is further configured to determine a scanning range of the robot based on the three-dimensional data, and determine a three-dimensional map within the scanning range of the robot as the valid portion of the three-dimensional map.

According to an embodiment of the present disclosure, the two-dimensional map matching module is further configured to: match the two-dimensional projection map with the two-dimensional map constructed by the robot by using a method of maximizing an overlapping area; and obtain the correspondence between the two-dimensional projection map and the two-dimensional map constructed by the robot when the overlapping area between the two-dimensional projection map and the two-dimensional map constructed by the robot is maximized.

According to an embodiment of the present disclosure, the map matching module further includes: a first obstacle marker acquiring module configured to acquire a marker of at least one specified obstacle in the three-dimensional map; a second obstacle marker acquiring module configured to acquire a marker of the at least one specified obstacle in the two-dimensional map constructed by the robot; and a marker matching module configured to match the marker of the at least one specified obstacle in the three-dimensional map with the marker of the at least one specified obstacle in the two-dimensional map constructed by the robot to obtain the correspondence between the three-dimensional map and the two-dimensional map constructed by the robot.

According to an embodiment of the present disclosure, is the at least one specified obstacle includes a plurality of specified obstacles, and the plurality of the specific obstacles are not located on a straight line.

According to an embodiment of the present disclosure, the specified obstacles include a charging pile and a wall.

According to an embodiment of the present disclosure, the apparatus further comprises: a three-dimensional map correcting module configured to modify the three-dimensional map based on the two-dimensional map constructed by the robot when the robot constructs the two-dimensional map.

According to an embodiment of the present disclosure, the three-dimensional display module is further configured to display a three-dimensional model of the robot in equal scale with the three-dimensional map.

According to still another aspect of the present disclosure, provided is a device, which includes: a memory, a processor, and executable instructions stored in the memory and executable in the processor, wherein the processor implements any one of the methods as described above when executing the executable instructions.

According to yet another aspect of the present disclosure, provided is a computer-readable storage medium having computer-executable instructions stored thereon, wherein the executable instructions, when executed by a processor, cause the processor to implement any one of the methods as described above.

In the method for displaying a pose of a robot in a three-dimensional map according to embodiments of the present disclosure, after acquiring a three-dimensional map of a space in which the robot is located and a two-dimensional map constructed by the robot, the three-dimensional map is matched with the two-dimensional map constructed by the robot to obtain a correspondence between the three-dimensional map and the two-dimensional map constructed by the robot. Then, the pose of the robot is displayed in the three-dimensional map based on the pose of the robot on the two-dimensional map constructed by the robot and the correspondence between the three-dimensional map and the two-dimensional map constructed by the robot, thereby obtaining the height information of the obstacles in the area where the robot is located.

It should be understood that the above general description and the following detailed description are merely exemplary, and do not limit the present disclosure.

BRIEF DESCRIPTION OF THE DRAWINGS

The aforesaid and other objects, features and advantages of the present disclosure will be more apparent by describing the exemplary embodiments thereof in detail with reference to the accompanying drawings.

DETAILED DESCRIPTION

Figure 1:
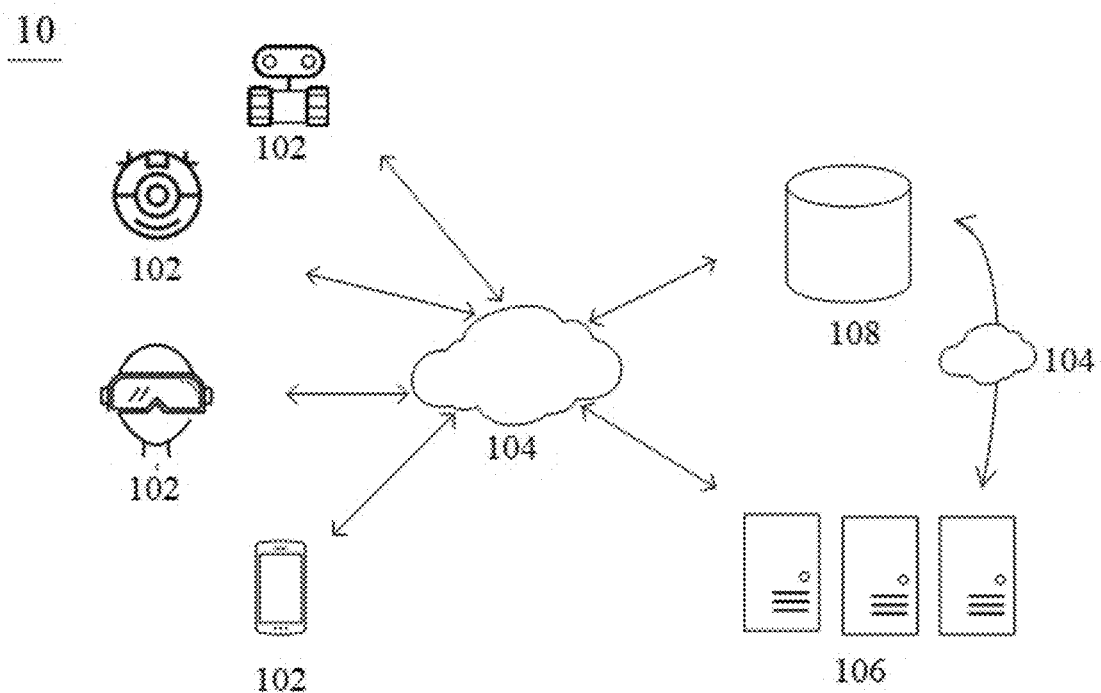
FIG. 1 is a schematic structural diagram of a system according to an embodiment of the present disclosure.

Exemplary embodiments will now be described more fully with reference to the accompanying drawings. However, the exemplary embodiments may be implemented in various forms, and should not be understood as limited to the embodiments set forth herein; rather, provision of these embodiments may enable the present disclosure to be more comprehensive and complete and thereby fully convey the concept of exemplary embodiments to those skilled in the art. In addition, the accompanying drawings are only schematic illustrations of the present disclosure and are not necessarily drawn to scale. The same reference numerals in the drawings denote the same or similar parts, and thus their repetitive descriptions will be omitted.

Furthermore, the features, structures, or characteristics as described may be combined in any suitable manner in one or more embodiments. In the following description, numerous specific details are provided so as to give a full understanding of the embodiments of the present disclosure. However, those skilled in the art may realize that the technical solutions of the present disclosure may be practiced with one or more of the specific details omitted, or by employing other methods, devices, steps, and the like. In other cases, the well-known structures, methods, devices, implementations or operations will not be shown or described in detail to avoid distracting and thereby obscuring all aspects of the present disclosure.

In the description of the present disclosure, "a plurality of" refers to at least two in number, which may for example refer to two, three or the like, unless otherwise specifically defined. The character "/" generally indicates that the relationship between the former and later associated objects is an "or" relationship.

In the present disclosure, unless otherwise expressly specified and defined, the terms "connect" and the like should be comprehended in a broad sense. For example, the term may refer to an electrical connection or a communication with each other, or may be connected directly or indirectly via an intermediate medium. The specific meanings about the foregoing terms in the present disclosure may be understood by those skilled in the art according to specific circumstances.

As mentioned above, the simultaneous map provided to the user by the robot in the related art is a two-dimensional map. Thus, the user can only know the plane state of the area where the robot is located through such a map, but cannot acquire the height information of obstacles in the area where the robot is located. Therefore, the present disclosure provides a method for displaying a pose of a robot in a three-dimensional map. By acquiring a three-dimensional map of the space where the robot is located and a two-dimensional mesh map constructed by the robot, matching the three-dimensional map with the two-dimensional mesh map to obtain the correspondence therebetween, and then displaying the pose of the robot in the three-dimensional map according to the pose of the robot on the two-dimensional mesh map and the correspondence between the three-dimensional map and the two-dimensional mesh map, the height information of obstacles in the area where the robot is located can be acquired. To facilitate the understanding, several terms involved in the present disclosure will be firstly explained below.

The intelligent robot refers to a comprehensive system integrating multi-functions such as environment perception, dynamic decision-making and planning, and behavior control and execution, etc. It integrates the research results of multiple disciplines such as sensor technology, information processing, electronic engineering, computer engineering, automation control engineering and artificial intelligence, which represents the highest achievement of mechatronics, and is one of the most active fields of science and technology development at present. The intelligent robot may be divided into stationary robots and mobile robots based on the moving manner. The stationary robots such as robotic arms are widely applied in industry. The mobile robots may be divided into wheel-type mobile robots, walking mobile robots, crawler-type mobile robots, crawling robots, creeping-type robots and swimming-type robots and the like based on the moving manner, may be divided into indoor mobile robots and outdoor mobile robots based on the working environment, may be divided into functional (horizontal) structural robots, behavioral (vertical) structural robots and hybrid robots based on the structure of the control system, and may be divided into medical robots, military robots, robots for the disabled, cleaning robots, and the like based on the functions and uses. With the improvements in performance, the mobile robots have been applied in a rather wide scope, which not only includes the industry, agriculture, medical, services and the like but also includes some harmful and dangerous occasions such as urban security, national defense, and space exploration fields.

The mobile robot refers to a robotic system consisting of sensors, remote operators, and automatically controlled mobile carriers. The mobile robot, which has a mobile functionality, may have a greater maneuverability and flexibility than stationary robots in terms of replacing humans in dangerous and harsh (e.g., radiation, toxic, etc.) environments and in environments beyond the reach of humans (e.g., cosmic space, underwater, etc.).

For augmented reality (AR), it is a new technology that "seamlessly" integrates the information in the real world with that in the virtual world. In AR, the physical information (visual information, sound, taste, touch, etc.) that is difficult to experience within a certain time and space range in the real world is simulated and then superimposed by the computer and other technologies, so as to apply the virtual information to the real world and make the same be perceived by human senses, so that the real environment and the virtual objects are superimposed on the same picture or space in real time on a same screen or space in real time and exist at the same time to achieve a sensory experience beyond reality.

FIG. 1 shows an exemplary system architecture 10 to which the method or device for displaying a pose of a robot in a three-dimensional map according to the present disclosure may be applied.

As shown in FIG. 1, the system architecture 10 may include a terminal device 102, a network 104, a server 106, and a database 108. The terminal device 102 may be a variety of electronic devices having a display screen and supporting the input and output, which includes but is not limited to smartphones, tablets, laptops, desktop computers, AR headsets, mobile robots (e.g., cleaning robots, guide robots), and the like. The network 104 is a medium for providing a communication link between the terminal device 102 and the server 106. The network 104 may include various connection types, such as wired, wireless communication links, fiber optic cables, an/or the like. The server 106 may be a server or cluster of servers providing various services, for example a backend processing server providing support for map modeling of data sent by a cleaning robot 102 that perceives the work environment. The database 108 may be a repository that organizes, stores, and manages data according to a data structure, including but not limited to a relational database, a cloud database and the like, such as a database that stores map data of a robot's work area.

The user may use the terminal device 102 to interact with the server 106 and the database 108 via the network 104 to receive or send the data and the like. The server 106 may also receive or send the data from/to the database 108 via the network 104. For example, after acquiring the three-dimensional map of the work area of the cleaning robot 102 from the database 108, the server 106 may plan a working route for the robot and send information of the working route as planned to the AR headset 102 via the network 104, and the user can view the simulated working route of the cleaning robot in the AR map via the AR headset.

It should be understood that the numbers of terminal devices, networks, and servers in FIG. 1 are merely illustrative, and they may be any number of terminal devices, networks, and servers depending on the implementation needs.

Figure 2:
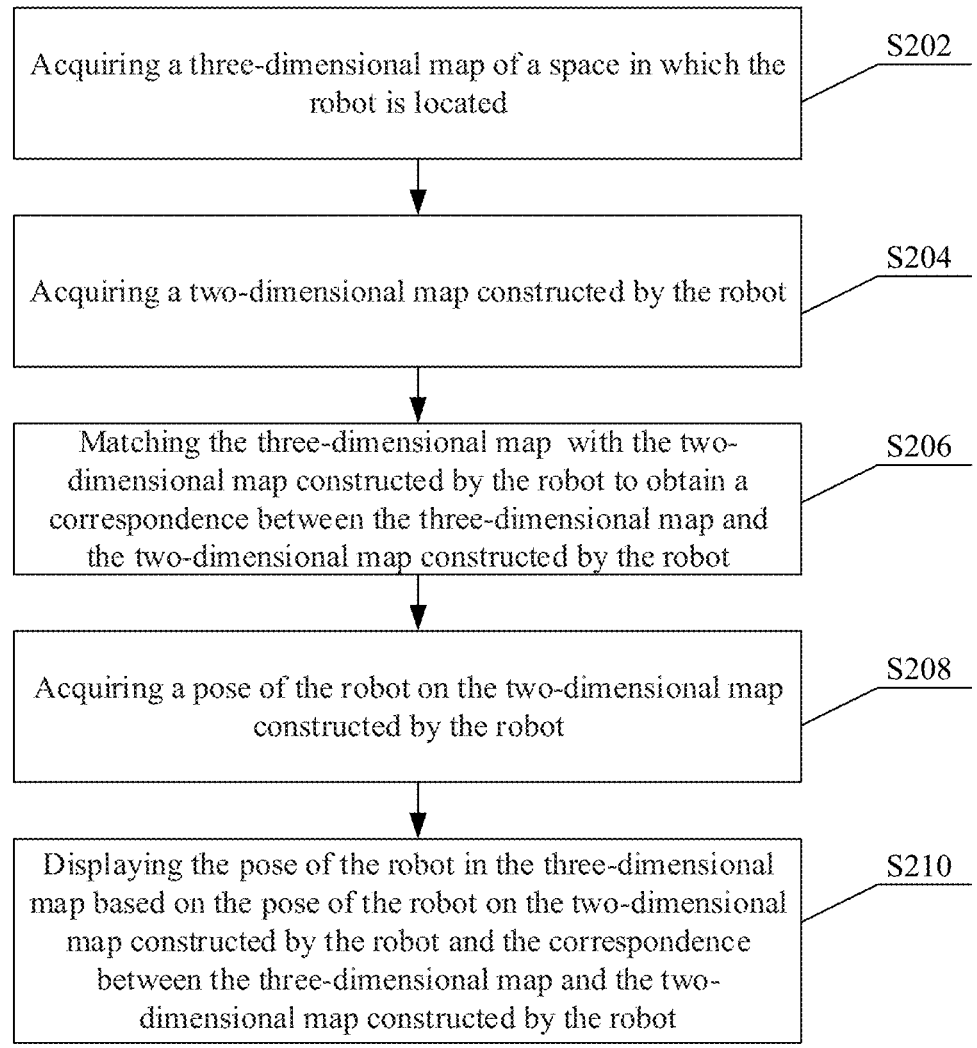
FIG. 2 is a flowchart of a method for displaying a pose of a robot in a three-dimensional map according to an embodiment of the present disclosure.

FIG. 2 is a flowchart of a method for displaying a pose of a robot in a three-dimensional map according to an exemplary embodiment. The method as shown in FIG. 2 may be applied, for example, to the server side of the aforesaid system or to the terminal device of the aforesaid system.

Referring to FIG. 2, the method 20 according to the embodiment of the present disclosure may include following steps.

Figure 3A:
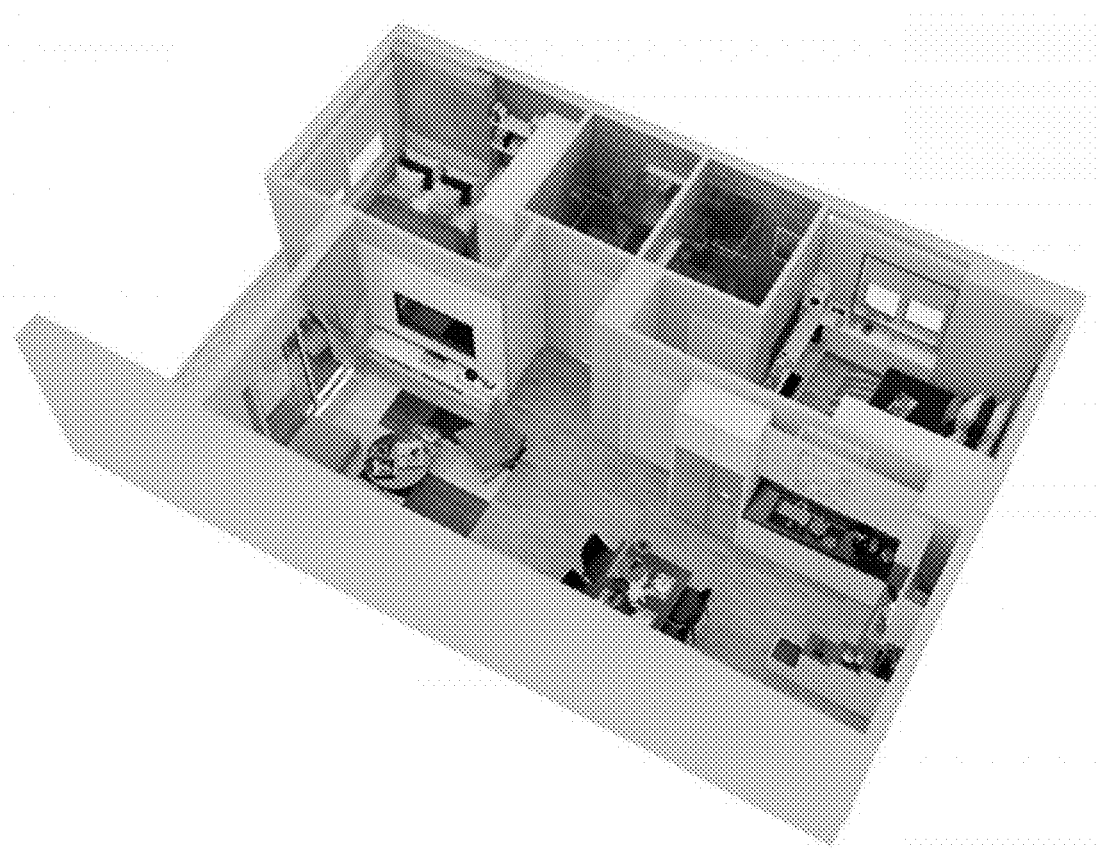
FIG. 3A is a schematic diagram of a three-dimensional map of a space in which a robot is located according to an embodiment of the present disclosure.
Figure 3B:
FIG. 3B is a schematic diagram of another three-dimensional map of a space in which a robot is located according to an embodiment of the present disclosure.
Figure 3C:
FIG. 3C is a schematic diagram of still another three-dimensional map of a space in which a robot is located according to an embodiment of the present disclosure.

In step S202, a three-dimensional map of the space where the robot is located is acquired. A three-dimensional map plotting device may be provided in the space where the robot works. An AR application (such as an AR application based on ARkit, ARcore or other platforms) on the three-dimensional map plotting device may be adopted to implement the plotting. In particular, a dense point cloud of the space is acquired firstly, and then a three-dimensional mesh model of the space is generated based on the point cloud. Afterwards, based on the generated mesh model, the model map is completed, that is, mapping the texture to the three-dimensional mesh model of the space through coordinates to complete the plotting of the three-dimensional map. As shown in FIGS. 3A to 3C that are schematic diagrams of three three-dimensional maps of the space in which the robot is located. FIG. 3A is a schematic diagram of a panoramic angle of a three-dimensional map of the space in which the robot is located; FIG. 3B is a partial enlarged view of the three-dimensional map of the space in which the robot is located; and FIG. 3C is a top view of the three-dimensional map of the space in which the robot is located.

As an AR application framework, ARkit allows developers to implement AR applications (such as three-dimensional map plotting applications) on mobile devices by combining the hardware such as the camera, motion sensor, and graphics processor of the mobile device with algorithms such as depth sensing and artificial light rendering. ARcore can achieve similar functions as the ARkit.

Figure 4A:
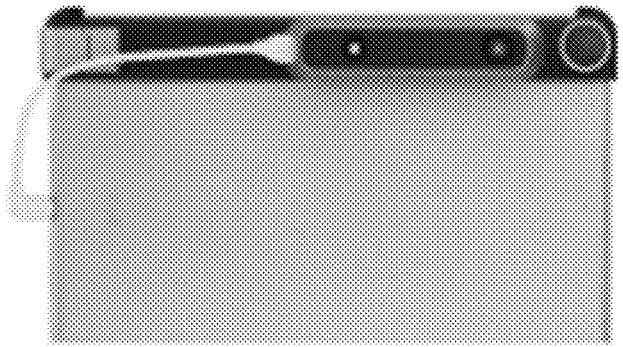
FIG. 4A is a schematic diagram of AR equipment for plotting a three-dimensional map according to an embodiment of the present disclosure.
Figure 4B:
FIG. 4B is a schematic diagram of another AR equipment for plotting a three-dimensional map according to an embodiment of the present disclosure.

The three-dimensional map may be plotted with a device having the three-dimensional map plotting function. In some embodiments, for example, the three-dimensional map plotting may be implemented with an AR device including an AR plotting device, and the AR plotting device may be a mobile terminal device having the three-dimensional map plotting function, including but not limited to iPAD Pro, CANVAS iPAD, and other devices with depth imaging capabilities. As shown in FIGS. 4A to 4B, FIG. 4A is a schematic diagram of an AR plotting device CANVAS iPAD, and FIG. 4B is a schematic diagram of an AR plotting device iPAD Pro. The three-dimensional map plotted by the AR device may be sent to a three-dimensional display device, which may be an AR display device, and the AR display device may be included in the AR device. The AR display device may be a mobile terminal device having a function to display the three-dimensional map and a preset model, including but not limited to an iPAD, an iPhone, and other devices having a display function. The AR plotting device and the AR display device may be the same device.

In step S204, a two-dimensional map constructed by the robot is acquired. The robot may construct a two-dimensional map in real time during the moving process. For example, a cleaning robot may measure the distance between itself and various obstacles in the work area via the installed LDS during the cleaning process, so as to plot a simultaneous map of the area where it is located. A variety of lidar simultaneous localization and mapping (SLAM) methods may be adopted to plot the simultaneous map, such as a HectorSLAM algorithm based on optimization (solving least squares problems), a Gmapping algorithm based on particle filter, a Cartographer, and the like. The Cartographer refers to a two-dimensional and three-dimensional SLAM library supported by an open-source robot operating system (ROS) of Google.

In the method provided by the embodiments of the present disclosure, the acquiring of the three-dimensional map of the space where the robot is located involved in step S202 may be performed in advance, and the acquired map may be stored at the server side or the terminal device. In addition, this step may also be performed simultaneously with the acquiring of the two-dimensional map constructed by the robot involved in step S204, which is not limited in embodiments of the present disclosure.

In step S206, the three-dimensional map is matched with the two-dimensional map constructed by the robot to obtain a correspondence between the three-dimensional map and the two-dimensional map constructed by the robot. The objects in the two-dimensional map may be correspondingly displayed in the three-dimensional map based on the correspondence between the three-dimensional map and the two-dimensional map constructed by the robot.

In some embodiments, for example, the three-dimensional map may be projected toward the ground plane to generate a two-dimensional projection map, thereby obtaining the correspondence between the two-dimensional projection map and the three-dimensional map. Then, the two-dimensional projection map is matched with the two-dimensional map constructed by the robot, for example using the optimization algorithm to iterate so as to obtain the correspondence between the two maps when their overlapping area is the largest. Afterwards, the three-dimensional map is associated with the two-dimensional map to obtain the correspondence between the three-dimensional map and the two-dimensional map. A reference may be made to FIG. 5 for the specific implementation, which will not be detailed here.

In some other embodiments, for example, the three-dimensional map may be matched with the two-dimensional map based on positions of the markers in the three-dimensional map and the corresponding markers in the two-dimensional map. A reference may be made to FIG. 8 for the specific implementation, which will not be detailed here.

In step S208, a pose of the robot on the two-dimensional map constructed by the robot is obtained. Through the SLAM method, with various internal sensors (e.g., odometer, compass, accelerometer, etc.) provided in the robot itself, the pose is estimated through the fusion of various sensing information, and by using external sensors (e.g., laser range finder, vision device, etc.) at the same time to perceive the environment, the environmental features are compared to correct the pose, thereby obtaining the pose of the robot on the two-dimensional map.

In the method provided by the embodiments of the present disclosure, the obtaining the pose of the robot on the two-dimensional map involved in step S208 may be performed while the robot is constructing the two-dimensional map, or may be performed after the two-dimensional map is constructed, which is not be limited in embodiments of the present disclosure.

In step S210, the pose of the robot is displayed in the three-dimensional map based on the pose of the robot on the two-dimensional map constructed by the robot and the correspondence between the three-dimensional map and the two-dimensional map constructed by the robot. The pose of the robot on the two-dimensional map may be mapped to the three-dimensional map after the correspondence between the three-dimensional map and the two-dimensional is obtained, and when displaying, the three-dimensional model of the robot may be displayed in combination with the three-dimensional map in equal scale, so that the real-time pose of the robot in the three-dimensional map can be visually observed on the AR display device.

In the method for displaying a pose of a robot in a three-dimensional map according to embodiments of the present disclosure, a three-dimensional map of the space where the robot is located and a two-dimensional map constructed by the robot are acquired firstly, and then, the three-dimensional map is matched with the two-dimensional map to obtain the correspondence therebetween. Afterwards, the pose of the robot is displayed in the three-dimensional map according to the pose of the robot on the two-dimensional map and the correspondence between the three-dimensional map and the two-dimensional map, thereby obtaining the height information of obstacles in the area where the robot is located.

Figure 5:
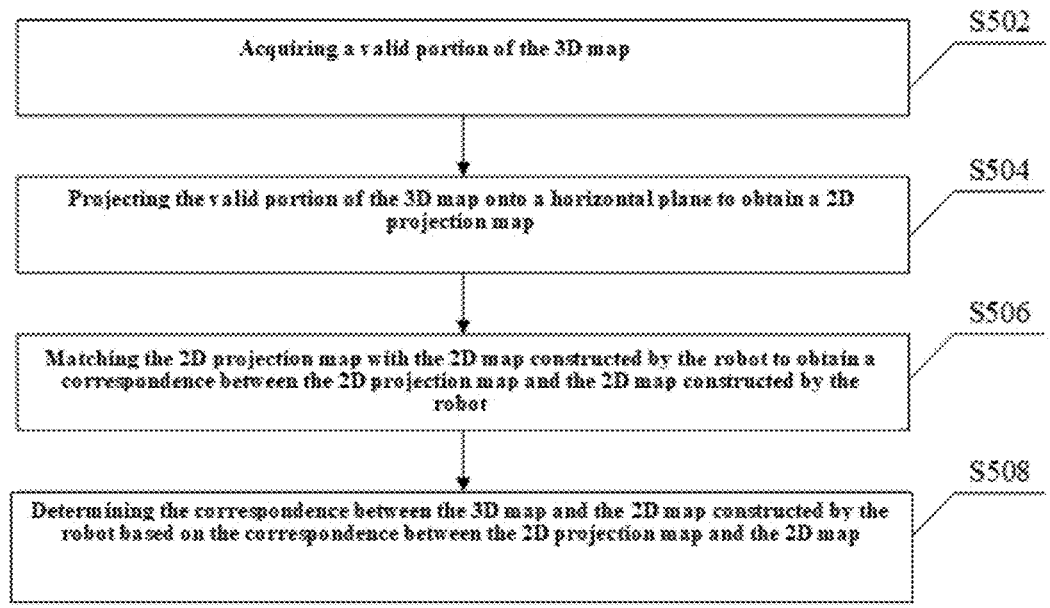
FIG. 5 is a flowchart of a method for matching a three-dimensional map with a two-dimensional mesh map according to an embodiment of the present disclosure.

FIG. 5 is a flowchart of a method for matching the three-dimensional map with the two-dimensional map according to an exemplary embodiment. The method as shown in FIG. 5 may be applied, for example, to the server side of the aforesaid system or to the terminal device of the aforesaid system.

Referring to FIG. 5, the method 50 provided by the embodiment of the present disclosure may include following steps.

In step S502, a valid portion of the three-dimensional map is acquired. In the solution provided by the embodiment of the present disclosure, the robot is installed with an LDS to realize the measurement of surrounding obstacles and plotting of a two-dimensional map by the robot. The LDS provided on the robot may have a certain field of view in the vertical direction, so the range scanned by the LDS may also be a three-dimensional area. In general, due to the problems that the robot per se is short and the LDS has a limited vertical field of view, the LDS may fail to scan the higher position in the environment where the robot is located. At this time, the two-dimensional map generated based on the LDS only includes the part of the robot's environment close to the ground.

In some embodiments, for example, a part of the corresponding height may be selected from the three-dimensional map based on height set by the LDS and the field of view of the LDS in the vertical direction to obtain the portion of the three-dimensional map corresponding to the scanning range of the LDS of the robot.

In some other embodiments, for example, the point cloud outside the scanning range of the robot may be filtered out of the point cloud of the three-dimensional map, and then the correspondence between the three-dimensional map and the point cloud within the scanning range of the robot of the three-dimensional map may be obtained as a part of the three-dimensional map. A reference may be made to FIG. 7 for the specific implementation, which will not be detailed here.

In step S504, the valid portion of the three-dimensional map is projected to the horizontal plane to obtain a two-dimensional projection map. The point cloud of part of the three-dimensional map may be projected in the direction of the ground plane according to the correspondence with the three-dimensional map to obtain a two-dimensional projection map.

Figure 6:
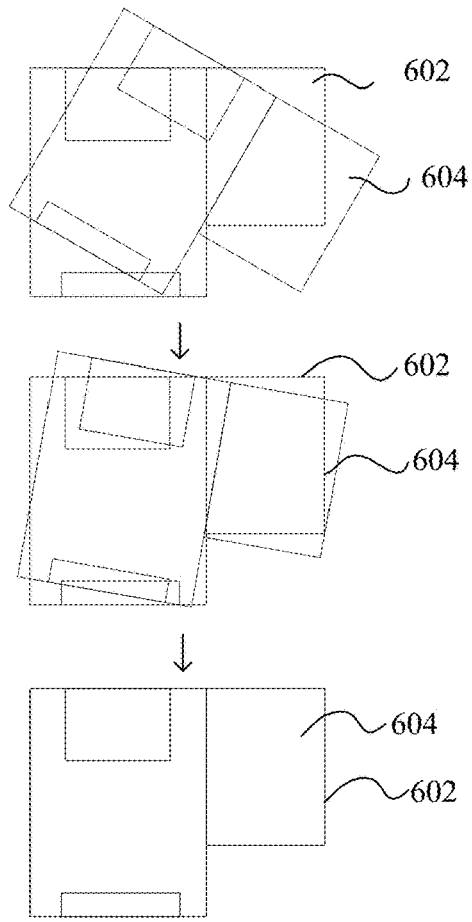
FIG. 6 is a schematic diagram of a process for matching a two-dimensional projection map with a two-dimensional mesh map according to an embodiment of the present disclosure.

In step S506, the two-dimensional projection map is matched with the two-dimensional map constructed by the robot to obtain the correspondence between the two-dimensional projection map and the two-dimensional map constructed by the robot. In embodiments of the present disclosure, a method of maximizing the overlapping area may be used to match the two-dimensional projection map with the two-dimensional mesh map. That is, after the two-dimensional projection map is represented in a coordinate system of the two-dimensional mesh map (or the two-dimensional mesh map is represented in the coordinate system of the two-dimensional projection map), the overlapping area of the two maps is calculated while performing operations such as rotation, translations, and the like, and iterations are continuously performed to obtain the correspondence between the two-dimensional projection map and the two-dimensional mesh map when the overlapping area between the two-dimensional projection map and the two-dimensional mesh map is maximized. FIG. 6 is a schematic diagram of a process for matching the two-dimensional projection map with the two-dimensional map constructed by the robot. FIG. 6 from top to bottom shows a process in which the overlapping area of the two-dimensional projection map 602 and the two-dimensional map 604 gradually increases until it is close to coincidence. The matching between the two-dimensional projection map 602 and the two-dimensional map 604 is completed when they coincide over each other, and the rotation and translation parameters may be obtained from the process.

In step S508, the correspondence between the three-dimensional map and the two-dimensional map constructed by the robot is determined based on the correspondence between the two-dimensional projection map and the two-dimensional map. Since the two-dimensional projection map is acquired from the three-dimensional map, the correspondence between the two-dimensional projection map and the three-dimensional map can be obtained. Then, the correspondence between the three-dimensional map and the two-dimensional map may be determined based on the correspondence between the two-dimensional projection map and the two-dimensional map.

In the method provided by the embodiment of the present disclosure, a portion in the three-dimensional map within the scanning range of the robot is projected in the direction of the ground plane to obtain a two-dimensional projection map. Then, the two-dimensional projection map is matched with the two-dimensional map constructed by the robot to determine the correspondence between the three-dimensional map and the two-dimensional map according to the correspondence between the two-dimensional projection map and the two-dimensional map constructed by the robot, which can effectively prevent the occurrence of poor matching effect caused by the projection of object images in the three-dimensional map outside the scanning range of the robot into the two-dimensional projection map.

Figure 7:
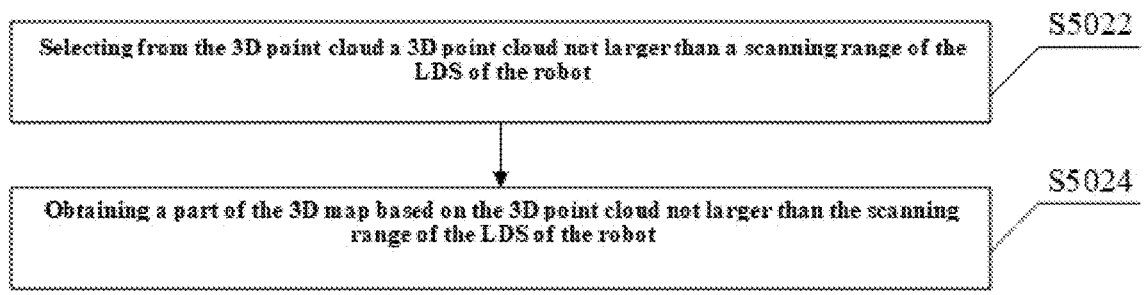
FIG. 7 is a schematic diagram of a processing process of step S502 shown in FIG. 5 according to an embodiment.

FIG. 7 is a schematic diagram of a processing process of step S502 shown in FIG. 5 according to an embodiment. The three-dimensional map includes a three-dimensional point cloud of the space where the robot is located, and a part of the three-dimensional map may include a three-dimensional point cloud of the space within the scanning range of the LDS of the robot. As shown in FIG. 7, step S502 in this embodiment of the present disclosure may further include following steps.

In step S5022, a three-dimensional point cloud not larger than the scanning range of the LDS of the robot is selected from the three-dimensional point cloud. Based on the coordinates of the three-dimensional point cloud in the coordinate axis perpendicular to the ground in the map coordinate system (e.g., Earth coordinate system), a three-dimensional point cloud not larger than the scanning range of the LDS of the robot may be selected. For example, the scanning height of the LDS of the cleaning robot in the vertical direction may be 15 cm, 20 cm, 25 cm, or the like.

In step S5024, a part of the three-dimensional map is obtained based on the three-dimensional point cloud not larger than the scanning range of the LDS of the robot.

In the method provided by the embodiment of the present disclosure, in the 3D-2D conversion of the three-dimensional map, only the point cloud within the range that can be scanned by the robot is retained for projection onto the ground plane through the three-dimensional map to generate the two-dimensional projection map, which can improve accuracy of the matching between the three-dimensional map and the two-dimensional map constructed by the robot.

Figure 8:
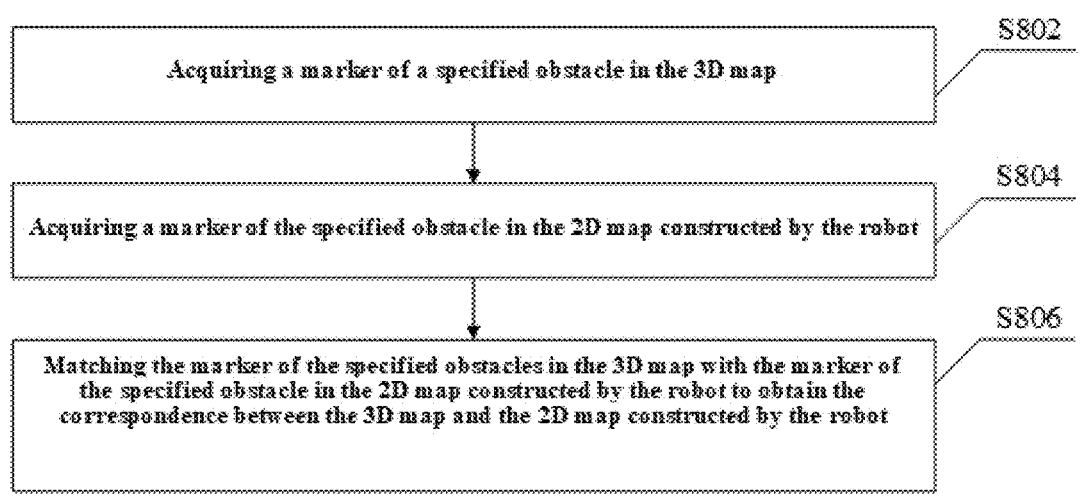
FIG. 8 is a flowchart of another method for matching a three-dimensional map with a two-dimensional mesh map according to an exemplary embodiment.

FIG. 8 is a flowchart of another method for matching a three-dimensional map with a two-dimensional map according to an exemplary embodiment. The method as shown in FIG. 8 may be applied, for example, to the server side of the aforesaid system or to the terminal device of the aforesaid system.

Referring to FIG. 8, the method 80 provided by the embodiment of the present disclosure may include following steps S802 to S806.

In step S802, a marker of at least one specified obstacle in the three-dimensional map is acquired. The AR scanning device may automatically identify the at least one specified obstacle when shooting and acquire marker thereof in the three-dimensional map. The at least one specified obstacle may for example be a charging pile, a table, a chair, a wall, and so on. The wall plane may also be identified. After being photographed by the AR scanning device, a marked object is identified through an object recognition algorithm on the server via networking, or the picture of the marked object in the cleaning environment may be pre-stored locally and then matched and identified through the object recognition algorithm on the local device.

In step S804, the marker of the at least one specified obstacle in the two-dimensional map constructed by the robot is acquired. The robot may be provided with a shooting device. After the corresponding obstacle is identified through networking or local algorithm, the specified obstacle is marked by the robot during the two-dimensional map plotting process.

In step S806, the marker of the at least one specified obstacle in the three-dimensional map is matched with the marker of the at least one specified obstacle in the two-dimensional map constructed by the robot to obtain the correspondence between the three-dimensional map and the two-dimensional map constructed by the robot. If matching by the marker of the specified obstacle, at least three specified obstacles not on the same line (connecting two of the markers into a marker line), or a line of a specified obstacle (such as the projection of the vertical plane of a wall on the ground plane, etc.) and a specified obstacle are required. Further, rotation parameters may firstly be calculated via the marker line, and then translation parameters are calculated by correlating the feature points of the markers to obtain the rotation and translation parameters that can match the three-dimensional map with the two-dimensional map.

In the method provided by the embodiment of the present disclosure, the three-dimensional map is matched with the two-dimensional map by the specified obstacle(s) identified during the map constructing process, which improves accuracy of the map matching to a certain extent.

Figure 9A:
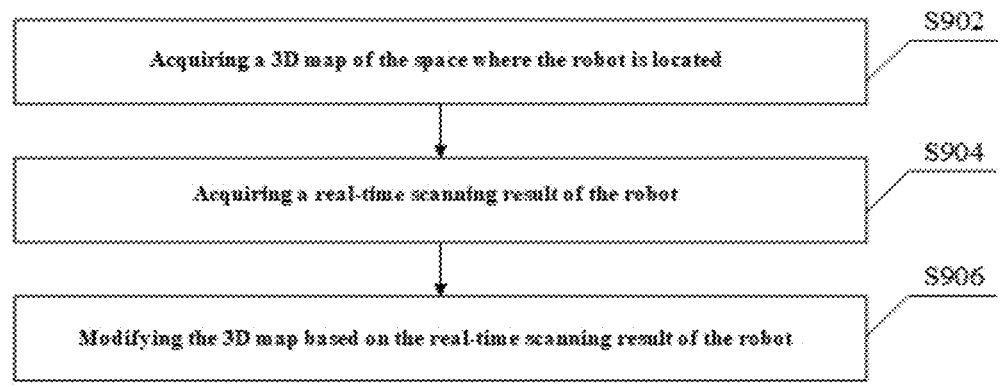
FIG. 9A is a flowchart of a working method of a robot according to an exemplary embodiment.

FIG. 9A is a flowchart of a working method of a robot according to an exemplary embodiment. The method as shown in FIG. 9A may be applied, for example, to the server side of the aforesaid system or to the terminal device of the aforesaid system.

Referring to FIG. 9A, the method 90 provided by the embodiment of the present disclosure may include following steps.

In step S902, a three-dimensional map of the space where the robot is located is acquired. The three-dimensional map of the space where the robot is located is plotted by the AR scanning device, and then may be shared to the AR display device.

Figure 9B:
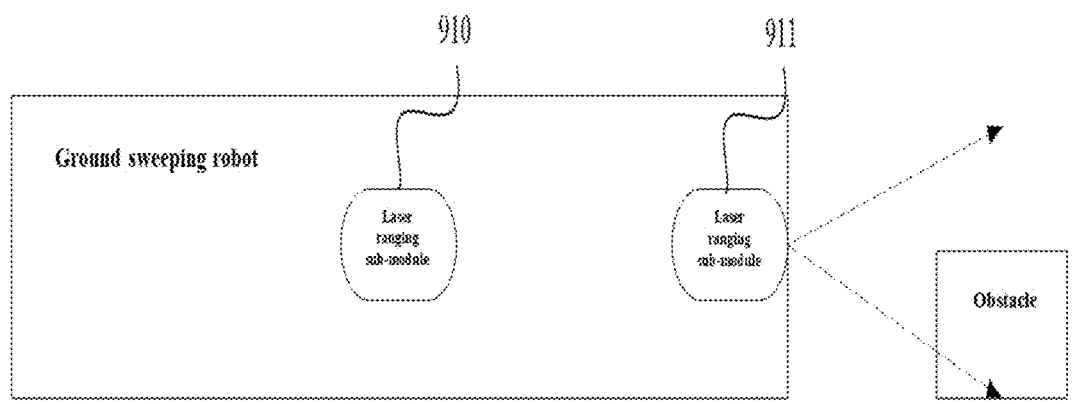
FIG. 9B is a schematic diagram of an architecture of a cleaning robot according to an exemplary embodiment.

In step S904, a real-time scanning result of the robot is acquired. During the working, the robot may scan the surrounding environment based on the SLAM method to obtain information about objects such as obstacles. FIG. 9B shows architecture of a sweeper. The sweeper is provided with front and side Time of Flight (ToF) sensor modules for perceiving the environment. The ToF sensor is configured to continuously transmit light pulses to the target, and then receive the light returned from the object, thereby obtaining the distance to the target by detecting the ToF (round trip) of the light pulses.

In step S904, the three-dimensional map is modified based on the real-time scanning result of the robot. The robot may send the real-time scanning result to the AR display device, and the AR display device supplements or corrects the three-dimensional map based on the real-time scanning result of the robot.

In the method provided by the embodiment of the present disclosure, the three-dimensional map generated by the AR scanning device may be supplemented or corrected based on the real-time scanning result of the robot, which improves accuracy of the three-dimensional map displayed.

Figure 10:
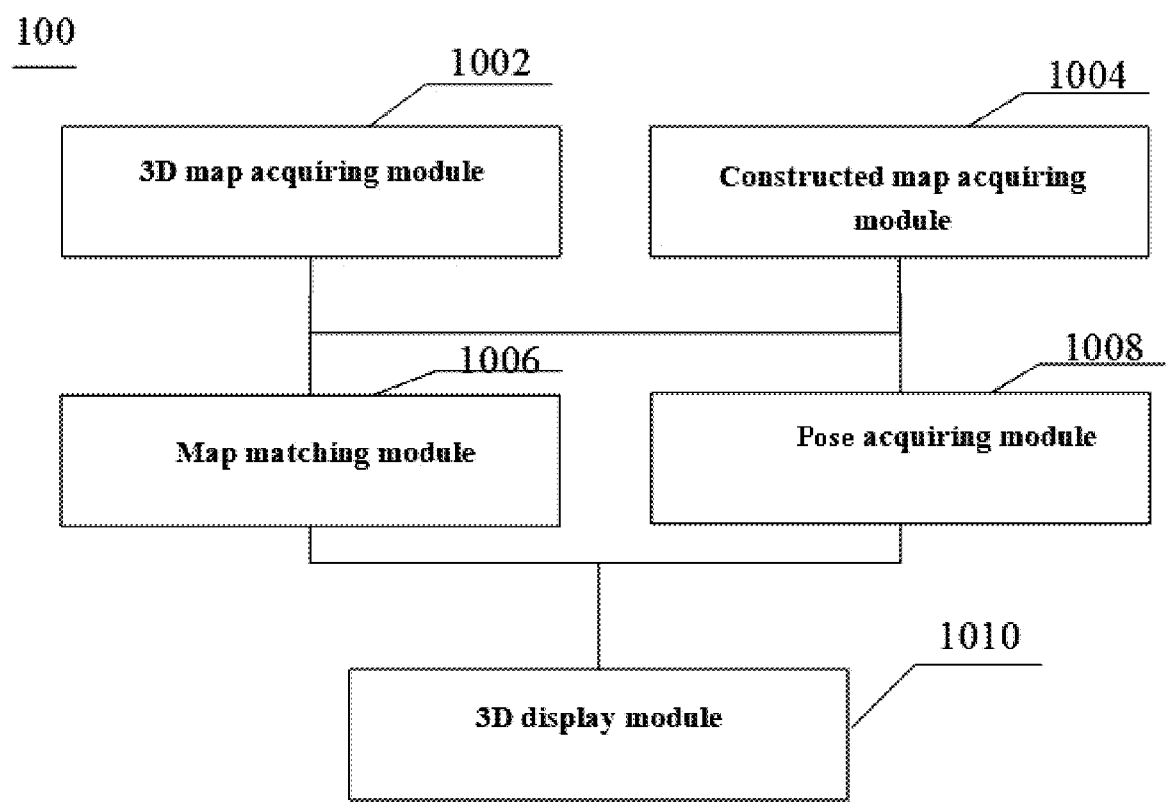
FIG. 10 is a block diagram of an apparatus for displaying a pose of a robot in a three-dimensional map according to an embodiment of the present disclosure.

FIG. 10 is a block diagram of an apparatus for displaying a pose of a robot in a three-dimensional map according to an exemplary embodiment. The device as shown in FIG. 10 may be applied, for example, to the server side of the aforesaid system or to the terminal device of the aforesaid system.

Referring to FIG. 10, the apparatus 100 according to the embodiment of the present disclosure may include a three-dimensional map acquiring module 1002, a constructed map acquiring module 1004, a map matching module 1006, a pose acquiring module 1008, and a three-dimensional display module 1010.

The three-dimensional map acquiring module 1002 is configured to acquire a three-dimensional map of a space in which the robot is located.

The constructed map acquiring module 1004 is configured to acquire a two-dimensional map constructed by the robot.

The map matching module 1006 is configured to match the three-dimensional map with the two-dimensional map constructed by the robot to obtain a correspondence between the three-dimensional map and the two-dimensional map constructed by the robot.

The pose acquiring module 1008 is configured to acquire a pose of the robot on the two-dimensional map constructed by the robot.

The three-dimensional display module 1010 is configured to display a pose of the robot in the three-dimensional map based on the pose of the robot on the two-dimensional map constructed by the robot and the correspondence between the three-dimensional map and the two-dimensional map constructed by the robot.

Figure 11:
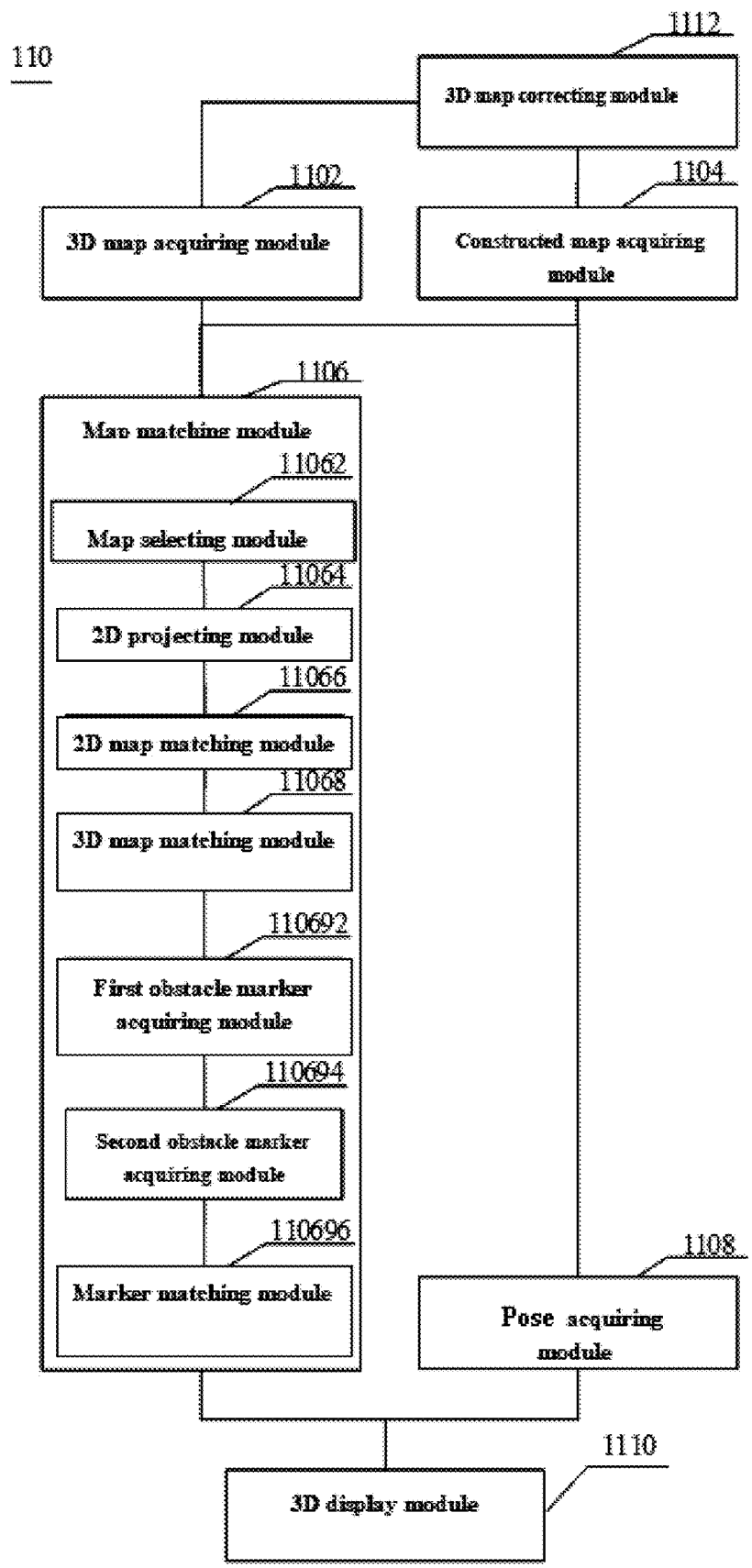
FIG. 11 is a block diagram of another apparatus for displaying a pose of a robot in a three-dimensional map according to an embodiment of the present disclosure.

FIG. 11 is a block diagram of an apparatus for displaying a pose of a robot in a three-dimensional map according to an exemplary embodiment. The device as shown in FIG. 11 may be applied, for example, to the server side of the aforesaid system or to the terminal device of the aforesaid system.

Referring to FIG. 11, the apparatus 110 according to the embodiment of the present disclosure may include a three-dimensional map acquiring module 1102, a constructed map acquiring module 1104, a map matching module 1106, a pose acquiring module 1108, a three-dimensional display module 1110, and a three-dimensional map correcting module 1112. The map matching module 1106 may include a map selecting module 11062, a two-dimensional projecting module 11064, a two-dimensional map matching module 11066, a three-dimensional map matching module 11068, a first obstacle marker acquiring module 110692, a second obstacle marker acquiring module 110694, and a marker matching module 110696.

The three-dimensional map acquiring module 1102 is configured to acquire a three-dimensional map of a space in which the robot is located.

The constructed map acquiring module 1104 is configured to acquire a two-dimensional map constructed by the robot. The obstacle data acquired by the robot in the process of constructing the two-dimensional map is three-dimensional data.

The map matching module 1106 is configured to match the three-dimensional map with the two-dimensional map constructed by the robot to obtain a correspondence between the three-dimensional map and the two-dimensional map constructed by the robot.

The map selecting module 11062 is configured to acquire a valid portion of the three-dimensional map.

The map selecting module 11062 is further configured to determine a scanning range of the robot based on the three-dimensional data, and determine a three-dimensional map within the scanning range of the robot as the valid portion of the three-dimensional map.

The two-dimensional projecting module 11064 is configured to project the valid portion of the three-dimensional map onto a horizontal plane to obtain a two-dimensional projection map.

The two-dimensional map matching module 11066 is configured to match the two-dimensional projection map with the two-dimensional map constructed by the robot to obtain a correspondence between the two-dimensional projection map and the two-dimensional map constructed by the robot.

The two-dimensional map matching module 11066 is further configured to: match the two-dimensional projection map with the two-dimensional map constructed by the robot by a method of maximizing the overlapping area; and obtain the correspondence between the two-dimensional projection map and the two-dimensional map constructed by the robot when the overlapping area between the two-dimensional projection map and the two-dimensional map constructed by the robot is maximized.

The three-dimensional map matching module 11068 is configured to determine the correspondence between the three-dimensional map and the two-dimensional mesh map based on the correspondence between the two-dimensional projection map and the two-dimensional mesh map.

The first obstacle marker acquiring module 110692 is configured to acquire the marker of the at least one specified obstacle in the three-dimensional map. There may be a plurality of specified obstacles, and the plurality of specific obstacles is not located on a straight line. The specified obstacles comprise a charging pile and a wall.

The second obstacle marker acquiring module 110694 is configured to acquire the marker of the at least one specified obstacle in the two-dimensional map constructed by the robot.

The marker matching module 110696 is configured to match the marker of the at least one specified obstacle in the three-dimensional map with the marker of the at least one specified obstacle in the two-dimensional map constructed by the robot to obtain the correspondence between the three-dimensional map and the two-dimensional map constructed by the robot.

The pose acquiring module 1108 is configured to acquire the pose of the robot on the two-dimensional map constructed by the robot.

The three-dimensional display module 1110 is configured to display the pose of the robot in the three-dimensional map based on the pose of the robot on the two-dimensional map constructed by the robot and the correspondence between the three-dimensional map and the two-dimensional map constructed by the robot.

The three-dimensional display module 1110 is further configured to display a three-dimensional model of the robot in equal scale with the three-dimensional map.

The three-dimensional map correcting module 1112 is configured to modify the three-dimensional map based on the two-dimensional map constructed by the robot when the robot constructs the two-dimensional map.

Figure 12:
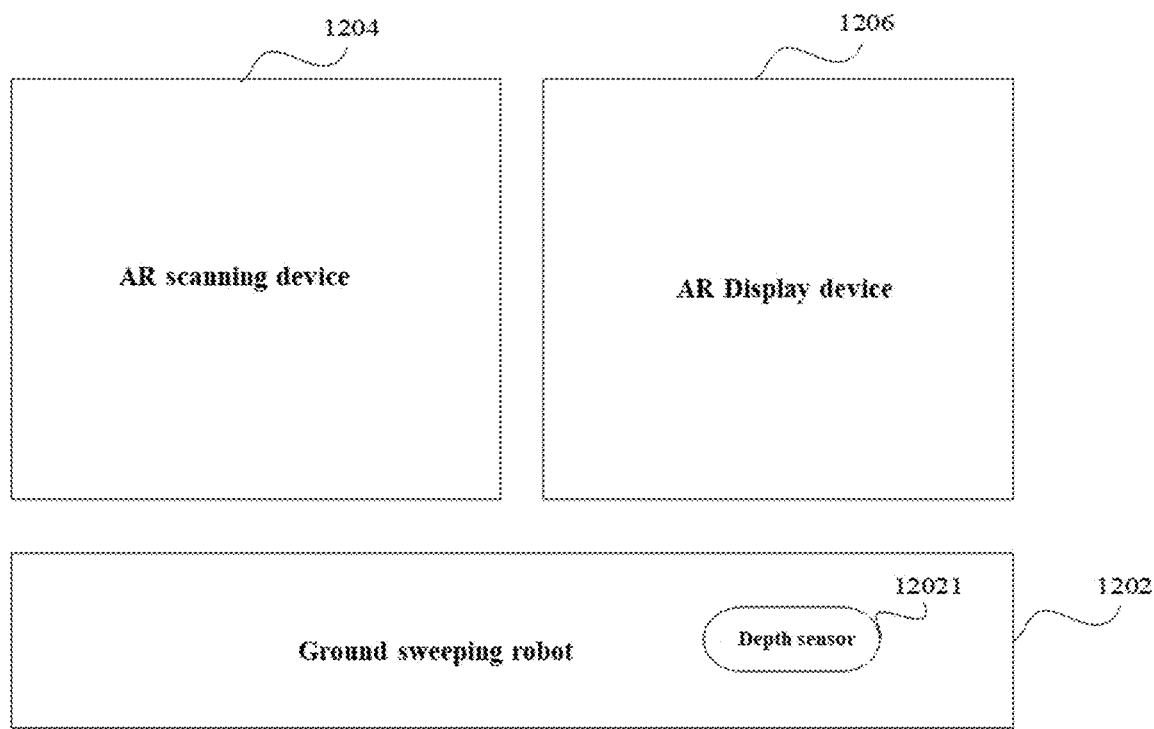
FIG. 12 is a block diagram of a system for displaying a pose of a robot in a three-dimensional map according to an embodiment of the present disclosure.

FIG. 12 is a block diagram of a system for displaying a pose of a robot in a three-dimensional map according to an exemplary embodiment. As shown in FIG. 12, the cleaning robot 1202 provided with a depth sensor 12021 may be connected to an AR scanning device 1204, and may acquire a three-dimensional map of the environment in real time via the AR scanning device 1204. The cleaning robot 1202 may also acquire and save the three-dimensional map plotted by the AR scanning device 1204 when the cleaning robot 1202 performs cleaning for the first time or is reset by the user. The cleaning robot 1202 may be connected to the AR display device 1206 to send the two-dimensional mesh map and the poses thereof generated based on the depth sensor 12021 to the AR display device 1206 in real time, and may also upload the point cloud of the obstacles observed to the AR display device 1206, thereby enabling the AR display device 1206 to update the three-dimensional map. The AR scanning device 1204 may also be connected to the AR display device 1206, and after the AR scanning device 1204 plots the three-dimensional map, may share the three-dimensional map to the AR display device 1206, so that the AR display device 1206 matches the two-dimensional mesh map generated by the cleaning robot 1202 with the three-dimensional map to obtain and save the correspondence between the two-dimensional mesh map and the three-dimensional map. When the cleaning robot 1202 cleans the area again, the cleaning robot 1202 may upload the pose information to the AR display device 1206 in real time, and the AR display device 1206 displays the pose of the cleaning robot 1202 in real time in the three-dimensional map according to the saved correspondence between the two-dimensional mesh map and the three-dimensional map.

Figure 13:
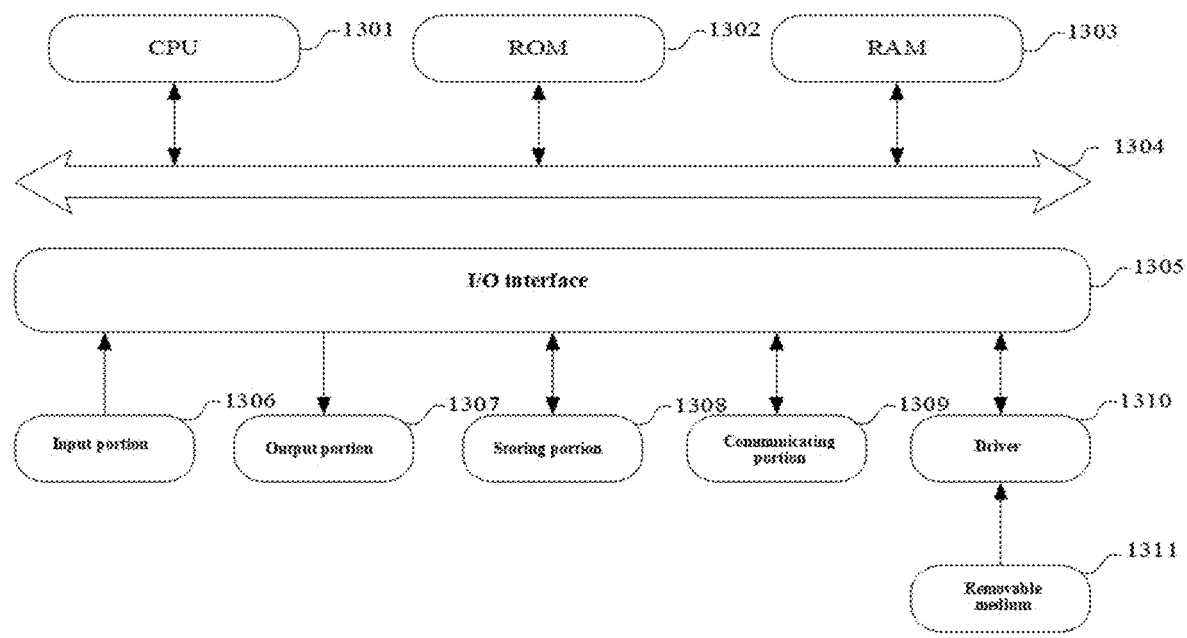
FIG. 13 is a schematic structural diagram of electronic device according to an embodiment of the present disclosure.

FIG. 13 is a schematic structural diagram of an electric device according to an embodiment of the present disclosure. It should be noted that the device shown in FIG. 13 is merely an example of a computer system and should not impose any limitation on the functionality and application scope of embodiments of the present disclosure.

As shown in FIG. 13, the device 1300 includes a central processing unit (CPU) 1301 that may perform various appropriate actions and processes based on a program stored in a read-only memory (ROM) 1302 or a program loaded into a random-access memory (RAM) 1303 from a storing portion 1308. The RAM 1303 further stores various programs and data required for the operation of the device 1300. The CPU 1301, ROM 1302, and RAM 1303 are connected to each other via a bus 1304. An input/output (I/O) interface 1305 is also connected to the bus 1304.

The I/O interface 1305 is connected with following components: an input portion 1306 including a keyboard, a mouse, and the like; an output portion 1307 including such as a cathode ray tube (CRT), a liquid crystal display (LCD), a speaker, and the like; a storing portion 1308 including a hard disk, and the like; and a communicating portion 1309 including a network interface card such as an LAN card, a modem, and the like. The communicating portion 1309 performs communication processing via a network such as the Internet. A driver 1310 is also connected to the I/O interface 1305 as needed. A removable medium 1311, such as a disk, an optical disk, a magneto-optical disk, a semiconductor memory, etc., is mounted on the drive 1310 as needed, so that the computer programs read from the removable medium may be mounted into the storing portion 1308 as needed.

In particular, according to embodiments of the present disclosure, the process described above with reference to the flowchart may be implemented as a computer software program. For example, embodiments of the present disclosure include a computer program product including a computer program carried on a computer-readable medium, and the computer program containing a program code for performing the method shown in the flowchart. In such an embodiment, the computer program may be downloaded and installed from the network via the communicating portion 1309, and/or installed from the removable medium 1311. The computer program, when executed by the CPU 1301, performs the aforesaid functions defined in the system of the present disclosure.

It should be noted that the computer-readable medium shown in embodiments of the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storing device, a magnetic storing device, or any suitable combination thereof. In the present disclosure, the computer-readable storage medium may be any tangible medium that includes or stores a program that may be used by or in combination with an instruction executing system, apparatus or device. In addition, in the present disclosure, the computer-readable signal medium may include a data signal propagated in a baseband or as part of a carrier wave, that carries a computer-readable program code. The propagated data signal may take a variety of forms, including but not limited to an electromagnetic signal, an optical signal, or any suitable combination thereof. The computer-readable signal medium may also be any computer-readable medium other than a computer-readable storage medium that may send, propagate, or transmit the program for use by or in combination with the instruction executing system, apparatus or device. The program code contained on the computer-readable medium may be transmitted via any suitable medium, including but not limited to wireless, wireline, fiber optic cable, RF, etc., or any suitable combination thereof.

The flowcharts and block diagrams in the accompanying drawings illustrate the architecture, functionality, and operation of possible implementations of the system, method, and computer program product according to various embodiments of the present disclosure. In this regard, each block in the flowchart or block diagram may represent a module, program segment, or portion of code that contains one or more executable instructions for implementing a prescribed logical function. It should also be noted that, in some alternative embodiments, the functions indicated in the blocks may also occur in an order different from the order indicated in the accompanying drawings. For example, two blocks shown in succession may actually be executed substantially in parallel, or they may sometimes be executed in the opposite order, depending on the function as involved. It should be noted that each block in the block diagram or flowchart, and the combination of blocks in the block diagram or flowchart may be implemented with a dedicated hardware-based system that performs the specified function or operation, or may be implemented with a combination of dedicated hardware and computer instructions.

The modules described in embodiments of the present disclosure may be implemented either by means of software or by means of hardware. The described modules may also be provided in a processor, and may for example be described as: a processor including a three-dimensional map acquiring module, a constructed map acquiring module, a map matching module, a pose acquiring module, and a three-dimensional display module. The names of these modules do not limit the module itself under certain circumstances. For example, the three-dimensional map acquiring module may also be described as "a module for acquiring a three-dimensional map from a connected AR plotting device".

As another aspect, the present disclosure further provides a computer-readable medium which may be included in the devices described in the aforesaid embodiments, or may exist alone without being assembled into the device. The above computer-readable medium carries one or more programs that, when executed by the device, enable the device to comprise: acquiring a three-dimensional map of a space in which the robot is located; acquiring a two-dimensional map constructed by the robot; matching the three-dimensional map with the two-dimensional map constructed by the robot to obtain a correspondence between the three-dimensional map and the two-dimensional map constructed by the robot; acquiring a pose of the robot on the two-dimensional map constructed by the robot; and displaying a pose of the robot in the three-dimensional map based on the pose of the robot on the two-dimensional map constructed by the robot and the correspondence between the three-dimensional map and the two-dimensional map constructed by the robot.

Exemplary embodiments of the present disclosure have been illustrated and described above. It should be understood that the present disclosure is not limited to the detailed structures, arrangements, or implementing methods described herein; rather, the present disclosure is intended to cover various modifications and equivalent arrangements included within the spirit and scope of the appended claims.

What is claimed is:

1. A method for displaying a pose of a robot in a three-dimensional map, comprising:
    acquiring, by a device, a three-dimensional map of a space in which the robot is located, wherein the device is a server or a terminal device, and the three-dimensional map is plotted by an Augmented Reality (AR) plotting device;
    acquiring, by the device, a two-dimensional map which is constructed by the robot in real time;
    matching, by the device, the three-dimensional map with the two-dimensional map constructed by the robot to obtain a correspondence between the three-dimensional map and the two-dimensional map constructed by the robot;
    acquiring, by the device, a pose of the robot on the two-dimensional map constructed by the robot; and
    displaying, by the device, a pose of the robot in the three-dimensional map based on the pose of the robot on the two-dimensional map constructed by the robot and the correspondence between the three-dimensional map and the two-dimensional map constructed by the robot;
    wherein matching the three-dimensional map with the two-dimensional map constructed by the robot to obtain the correspondence between the three-dimensional map and the two-dimensional map constructed by the robot comprises:
    acquiring, by the device, a valid portion of the three-dimensional map;
    projecting, by the device, the valid portion of the three-dimensional map onto a horizontal plane to obtain a two-dimensional projection map; and
    matching, by the device, the two-dimensional projection map with the two-dimensional map which is constructed by the robot during movement to obtain a correspondence between the two-dimensional projection map and the two-dimensional map which is constructed by the robot.

2. The method according to claim 1, wherein obstacle data acquired by the robot during constructing the two-dimensional map is three-dimensional data; and
    wherein acquiring the valid portion of the three-dimensional map comprises:
    determining, by the device, a scanning range of the robot based on the three-dimensional data; and
    determining, by the device, a three-dimensional map within the scanning range of the robot as the valid portion of the three-dimensional map.

3. The method according to claim 1, wherein matching the two-dimensional projection map with the two-dimensional map constructed by the robot to obtain the correspondence between the two-dimensional projection map and the two-dimensional map constructed by the robot comprises:
    matching, by the device, the two-dimensional projection map with the two-dimensional map constructed by the robot by using a method of maximizing an overlapping area; and
    obtaining, by the device, the correspondence between the two-dimensional projection map and the two-dimensional map constructed by the robot when the overlapping area between the two-dimensional projection map and the two-dimensional map constructed by the robot is maximized.

4. The method according to claim 1, wherein matching the three-dimensional map with the two-dimensional map constructed by the robot to obtain the correspondence between the three-dimensional map and the two-dimensional map constructed by the robot further comprises:
    acquiring, by the device, a marker of at least one specified obstacle in the three-dimensional map;
    acquiring, by the device, a marker of the at least one specified obstacle in the two-dimensional map constructed by the robot; and
    matching, by the device, the marker of the at least one specified obstacle in the three-dimensional map with the marker of the at least one specified obstacle in the two-dimensional map constructed by the robot to obtain the correspondence between the three-dimensional map and the two-dimensional map constructed by the robot.

5. The method according to claim 4, wherein the at least one specified obstacle comprises a plurality of specified obstacles, and the plurality of the specific obstacles are not located on a straight line.

6. The method according to claim 5, wherein the specified obstacles comprise a charging pile and a wall.

7. The method according to claim 1, further comprising:
modifying, by the device, the three-dimensional map based on the two-dimensional map constructed by the robot when the robot constructs the two-dimensional map.

8. The method according to claim 1, further comprising:
displaying, by the device, a three-dimensional model of the robot in equal scale with the three-dimensional map.

9. A device, comprising:
a processor; and
a memory storing instructions executable by the processor;
wherein when the instructions are executed by the processor, the device is caused to:
acquire a three-dimensional map of a space in which the robot is located, wherein the device is a server or a terminal device, and the three-dimensional map is plotted by an Augmented Reality (AR) plotting device;
acquire a two-dimensional map which is constructed by the robot in real time;
match the three-dimensional map with the two-dimensional map constructed by the robot to obtain a correspondence between the three-dimensional map and the two-dimensional map constructed by the robot;
acquire a pose of the robot on the two-dimensional map constructed by the robot; and
display a pose of the robot in the three-dimensional map based on the pose of the robot on the two-dimensional map constructed by the robot and the correspondence between the three-dimensional map and the two-dimensional map constructed by the robot;
wherein when the instructions are executed by the processor, the device is caused to:
acquire a valid portion of the three-dimensional map;
project the valid portion of the three-dimensional map onto a horizontal plane to obtain a two-dimensional projection map; and
match the two-dimensional projection map with the two-dimensional map which is constructed by the robot during movement to obtain a correspondence between the two-dimensional projection map and the two-dimensional map which is constructed by the robot.

10. The device according to claim 9, wherein obstacle data acquired by the robot during constructing the two-dimensional map is three-dimensional data; and
wherein when the instructions are executed by the processor, the device is caused to:
determine a scanning range of the robot based on the three-dimensional data; and
determine a three-dimensional map within the scanning range of the robot as the valid portion of the three-dimensional map.

11. The device according to claim 9, wherein when the instructions are executed by the processor, the device is caused to:
match the two-dimensional projection map with the two-dimensional map constructed by the robot by using a method of maximizing an overlapping area; and
obtain the correspondence between the two-dimensional projection map and the two-dimensional map constructed by the robot when the overlapping area between the two-dimensional projection map and the two-dimensional map constructed by the robot is maximized.

12. The device according to claim 9, wherein when the instructions are executed by the processor, the device is caused to:
acquire a marker of at least one specified obstacle in the three-dimensional map;
acquire a marker of the at least one specified obstacle in the two-dimensional map constructed by the robot; and
match the marker of the at least one specified obstacle in the three-dimensional map with the marker of the at least one specified obstacle in the two-dimensional map constructed by the robot to obtain the correspondence between the three-dimensional map and the two-dimensional map constructed by the robot.

13. The device according to claim 12, wherein the at least one specified obstacle comprises a plurality of specified obstacles, and the plurality of the specific obstacles are not located on a straight line.

14. The device according to claim 13, wherein the specified obstacles comprise a charging pile and a wall.

15. The device according to claim 9, wherein when the instructions are executed by the processor, the device is caused to:
modify the three-dimensional map based on the two-dimensional map constructed by the robot when the robot constructs the two-dimensional map.

16. The device according to claim 9, wherein when the instructions are executed by the processor, the device is caused to:
display a three-dimensional model of the robot in equal scale with the three-dimensional map.

17. A computer-readable storage medium having computer-executable instructions stored thereon, wherein the executable instructions, when executed by a processor of a device, cause the device to:
acquire a three-dimensional map of a space in which the robot is located, wherein the device is a server or a terminal device, and the three-dimensional map is plotted by an Augmented Reality (AR) plotting device;
acquire a two-dimensional map which is constructed by the robot in real time;
match the three-dimensional map with the two-dimensional map constructed by the robot to obtain a correspondence between the three-dimensional map and the two-dimensional map constructed by the robot;
acquire a pose of the robot on the two-dimensional map constructed by the robot; and
display a pose of the robot in the three-dimensional map based on the pose of the robot on the two-dimensional map constructed by the robot and the correspondence between the three-dimensional map and the two-dimensional map constructed by the robot;
wherein when the executable instructions are executed by the processor of the device, the device is caused to:
acquire a valid portion of the three-dimensional map;
project the valid portion of the three-dimensional map onto a horizontal plane to obtain a two-dimensional projection map; and
match the two-dimensional projection map with the two-dimensional map which is constructed by the robot during movement to obtain a correspondence between the two-dimensional projection map and the two-dimensional map which is constructed by the robot.

* * * * *